Aug. 29, 1961  A. J. CORSON ET AL  2,998,571

VOLTMETER

Filed May 1, 1959

INVENTORS
ALMON J. CORSON
HAROLD RICH

BY Irving M. Freedman

THEIR ATTORNEY

United States Patent Office 2,998,571
Patented Aug. 29, 1961

2,998,571
VOLTMETER
Almon J. Corson, Marblehead, and Harold Rich, Lynn, Mass., assignors to General Electric Company, a corporation of New York
Filed May 1, 1959, Ser. No. 810,393
4 Claims. (Cl. 324—147)

This invention relates to an improved voltmeter construction and, in particular, to a construction in which the current limiting series resistor is arranged about the instrument coil in the instrument housing.

In electrical measuring instruments of the voltmeter type it is known to utilize a current limiting resistor in series with the current conducting winding which produces a magnetic field and resultant instrument deflection in accordance with the current flow therethrough. In switchboard type instruments the series resistor is usually placed external to the instrument compartment or housing, or enclosed within a separate housing attached to the instrument housing because of the limited ability of the instrument to function properly in the presence of heat produced by current flow through the series resistor. It is also known to utilize a capacitor in shunt with the current limiting resistor to compensate for errors which would result from frequency variations of the circuit under measurement. Such arrangements inherently increase the overall size of the instrument and include relatively complex insulating and connection problems.

It is an object of this invention to provide an improved voltmeter construction in which the current limiting resistor may be included within the instrument housing.

It is a further object of this invention to provide an improved voltmeter construction in which the current limiting resistor is wound about and spaced from the current conducting winding or field coil of the instrument.

Another object of the invention is to provide an improved voltmeter construction in which current flow through the current limiting resistor is utilized to produce magnetic flux for increasing the instrument sensitivity and torque.

It is yet another object of this invention to provide an improved voltmeter construction which is relatively inexpensive to manufacture and yet which provides improved operating characteristics.

A further object of this invention is to provide an improved voltmeter construction which is more compact and less bulky than present arrangements.

A still further object of this invention is to provide an improved voltmeter construction which includes a frequency compensating capacitor wound about the field coil of the instrument.

Further objects and advantages of the invention will become apparent as the following description proceeds and the features of novelty which characterize the invention will be pointed out with particularity in the claims annexed to and forming a part of this specification.

In accordance with one form of the invention, the current limiting resistor of the voltmeter is wound around and electrically and thermally insulated from the field coil with the combined structure positioned within the instrument housing and a resin, preferably of the epoxy type, poured between the assembly and the instrument housing.

In one embodiment of the invention, a frequency compensating capacitor surrounds and is insulated from the series resistor to be positioned between the series resistor and the instrument housing.

For a better understanding of this invention, reference may be had to the following description taken in connection with the accompanying drawings, in which.

Figure 1:
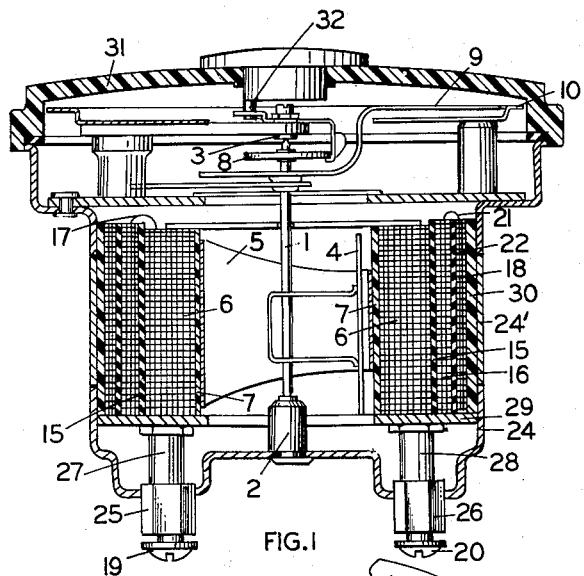
FIG. 1 is a sectional view of an electrical measuring instrument incorporating the subject invention.
Figure 2:
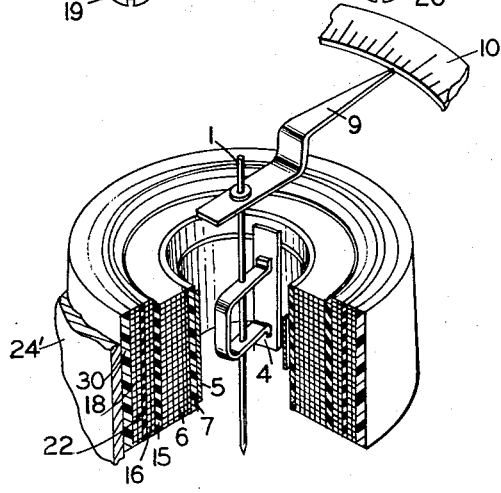
FIG. 2 is an isometric sectional view of a portion of the arrangement shown in FIG. 1 to better illustrate the invention; and, FIG. 3 is a schematic drawing showing the combined electrical circuit including the field coil, the series resistor and the frequency compensating capacitor.

Referring to FIGS. 1 and 2, the invention is shown embodied within an electrical instrument of the moving iron type, although it is not necessarily restricted to such an instrument. Shaft 1 is rotatably mounted and supported at the ends thereof by jewel bearings indicated generally as 2 and 3. The shaft 1 supports a movable iron or vane 4 for rotation therewith within the region defined by the stationary vane 5. A current or field coil 6 surrounds the stationary vane 5 and is separated therefrom by an insulating layer or member 7.

The control spring 8 positions the pointer attached to shaft 1 relative to scale 10 so that the pointer indicates zero when no current flows through the field coil 6.

As soon as current flows in the field coil 6, iron vanes 4 and 5 are inductively magnetized such that movable vane 4 deflects an amount proportional to the magnitude of the current flow through the field coil 6 in a manner well known in the art. The instrument described thus far is essentially the concentric-vane form of the conventional repulsion-type moving iron instrument. Such instruments may be utilized for the measurement of either current or voltage. Since the magnitude of current required for full scale deflection is in the milliamp range, a current limiting series resistor is utilized to limit the current flow through the instrument while enabling a flow which is proportional to the magnitude of the voltage impressed across the series circuit comprising the field coil and the series resistor.

In accordance with the present invention, the field coil 6 is surrounded by an electrically and thermally insulating layer 15 which may be formed of several layers of relatively thin paper known commercially as kraft paper. The current limiting or series resistor 16 is then wound around the kraft paper to surround the field coil 6. The series resistor 16 is electrically connected in series with field coil 6 by lead 17.

In high accuracy instruments, and in particular, instruments for use over a wide frequency range, it is known to add a frequency compensating capacitor in shunt with the series resistor to replace the current lost in the field coil through increased impedance of the coil as the frequency is increased. The electrical connection of such an arrangement is shown in FIG. 3.

Figure 3:
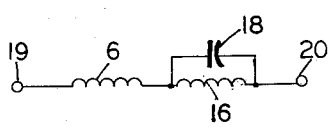

Referring to FIG. 3, it will be seen that the field coil 6 is electrically connected in series with the shunt combination of series resistor 16 and frequency conpensating capacitor 18 and the circuit is connected between the input terminals 19 and 20.

A frequency compensating capacitor may conveniently and compactly be included in the instrument assembly shown in FIGS. 1 and 2. Referring to FIGS. 1 and 2, a layer 22 of electrically insulating and heat conducting material is wound around the series resistor 16 and a capacitor 18 comprising alternate layers of foil and insulation is wound thereon. The inner end of the capacitor 18 is electrically connected in series with the resistor 16 by lead 21.

The entire assembly described thus far is positioned within the cup-shaped instrument housing 24. The closed end of housing 24 supports bearing 2 and the terminals 19 and 20 which pass through the cup member within the support bushings 25 and 26. The inner ends 27 and 28 of input terminals 19 and 20, respectively, extend within the member 24 and support the insulating member 29, which in turn supports the coil assembly described above, including field coil 6, series resistor 16 and frequency compensating capacitor 18. Electrical connection is made between the inner ends 27 and 28 of input terminals 19 and 20 and the ends of the series parallel coil assembly circuit.

In order to conduct the heat developed by the series resistor 16 away from field coil 6 and preclude adverse effects that variations of temperature have upon the temperature coefficient of resistance of the coil and thus upon the instrument, the space between the capacitor 18 and cup member 24 is filled with a heat conducting electrically insulating resin 30, preferably of the epoxy type. The resin should be of a type that will readily conduct heat, will readily flow to fill the space between the capacitor 18 and cup 24, will have low shrinkage, will provide good electrical insulation, be shock and vibration resistant, bond well to both the capacitor and the cup member and be chemically inert relative to the case and the components of the instrument in contact with it. Epoxy resins (ethoxyline), particularly the type known as epichlorohydrin bisphenol-A with a 50% filler with a diethylene triamine catalyst, has been found to exhibit the desired characteristics. The epoxy layer 30 insures good thermal conductivity between the series resistor 16 and the housing 24 while the kraft or insulation 15 thermally insulates the field coil from the heating effects of the series resistor. The portion 24' of housing 24 in contact with the resin should be heat conducting material such as metal.

The instrument housing may also conveniently include a transparent cover member 31, including the zero set mechanism shown generally as 32 which cooperates with the control spring 8 to enable adjustment of the torque thereof to secure zero indication at zero current flow. In the interest of brevity and clarity, the details of the zero set mechanism and the scale portions of the instrument housing will be omitted.

In operation, current flow through the field coil 6 also flows through the series resistor winding 16. Since the series resistor is wound within the instrument housing and around the field coil, current flow therethrough produces a flux which interacts with the moving system of the instrument to increase the torque. Such an arrangement may be utilized to increase the sensitivity of the instrument or to reduce the size of the instrument, since fewer turns are needed for the field coil 6 to provide an instrument of given electrical characteristics. Instead of reducing the size of the field coil 6, a larger wire size could be utilized to decrease the resistance of the field coil and thus reduce the temperature coefficient of resistance of the instrument. Such advantages are accomplished without an increase of instrument size. Since the series resistor adds to the instrument flux, it is desirable that the windings be of the uniform type in order to provide a uniform magnetic field for the moving system of the instrument.

It should be appreciated that while an alternating current voltmeter is described above, the subject invention could readily be utilized with a direct current type of voltmeter. Also, while the invention is described in relation to a moving-iron type of instrument, it may readily be utilized with other types of electrical indicating instruments, such as, for example, a moving magnet instrument.

Also, it should be appreciated that in arrangements wherein it is not necessary or desirable to utilize a frequency compensating capacitor 18, the capacitor may be omitted and the space between the series resistor 16 and the cup member 24 filled with the epoxy resin.

Therefore, while particular embodiments of the subject invention have been shown or described herein, they are in the nature of description rather than limitation, and it will occur to those skilled in the art that various changes, modifications and combinations may be made within the province of the appended claims without departing either in spirit or scope from this invention in its broader aspects.

What we claim as new and desire to secure by Letters Patent of the United States is:

1. In an electrical measuring instrument of the electromagnetic field type, a cup-shaped instrument housing, a coil having an opening therein concentrically positioned within said housing for developing a magnetic field in accordance with the current flow therethrough, a rotor member rotatably mounted within said coil opening linked by said magnetic field for deflection in accordance with said current, a concentric layer of thermally insulating material contacting said coil about the outer periphery thereof, a resistance coil adapted to be electrically connected in series with said coil, said resistance coil surrounding and contacting the outer periphery of said layer of thermally insulating material, said resistance coil being uniformly wound and sufficiently close to said coil to develop a magnetic field in accordance with the current flow therethrough which aids the magnetic field produced by said coil, and a thermally conductive plastic material filling the space between said resistance coil and the interior of the housing, said plastic material assisting in positioning and supporting said coil and said resistance coil.

2. The invention as claimed in claim 1 in which the thermally conductive plastic material filling the space between the resistance coil and the interior of the housing is a resin of the epoxy type.

3. In an electrical measuring instrument of the electromagnetic field type, a cup-shaped instrument housing, a coil having an opening therein concentrically positioned within said housing for developing a magnetic field in accordance with the current flow therethrough, a rotor member rotatably mounted within said coil opening linked by said magnetic field for deflection in accordance with said current, a concentric layer of thermally insulating material contacting said coil about the outer periphery thereof, a resistance coil adapted to be electrically connected in series with said coil, said resistance coil surrounding and contacting the outer periphery of said layer of thermally insulating material, said resistance coil being uniformly wound and sufficiently close to said coil to develop a magnetic field in accordance with the current flow therethrough which aids the magnetic field produced by said coil, a capacitor comprising alternate layers of foil and insulation wound about said resistance coil adapted to be electrically connected in parallel with said resistance coil, said capacitor being of a value capable of compensating for frequency variation changes, and a thermally conductive plastic material filling the space between said resistance coil and the interior of the housing, said plastic material assisting in positioning and supporting said coil and said resistance coil.

4. The invention as claimed in claim 3 in which the thermally conductive plastic material filling the space between the resistance coil and the interior of the housing is a resin of the epoxy type.

References Cited in the file of this patent

UNITED STATES PATENTS

| | | |
|---|---|---|
| 620,626 | Weymouth | Mar. 7, 1899 |
| 1,072,531 | Triplett | Sept. 9, 1913 |
| 1,586,445 | Hinkley | May 25, 1926 |
| 1,686,652 | Cone | Oct. 9, 1928 |
| 2,882,505 | Feder | Apr. 14, 1959 |